United States Patent
Chen et al.

(10) Patent No.: US 8,828,621 B2
(45) Date of Patent: Sep. 9, 2014

(54) MODULARIZED FUEL CELL DEVICES AND FLUID FLOW PLATE ASSEMBLIES

(75) Inventors: Chi-Chang Chen, Puxin Township, Changhua County (TW); Huan-Ruei Shiu, Cimei Township, Penghu County (TW); Chun-Hsing Wu, Taipei (TW); Fanghei Tsau, Kaohsiung (TW); Wen-Chen Chang, Zhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 248 days.

(21) Appl. No.: 12/860,460

(22) Filed: Aug. 20, 2010

(65) Prior Publication Data

US 2011/0136043 A1    Jun. 9, 2011

Related U.S. Application Data

(60) Provisional application No. 61/267,387, filed on Dec. 7, 2009.

(30) Foreign Application Priority Data

Mar. 12, 2010   (TW) ............... 99107218 A

(51) Int. Cl.
   *H01M 8/04*   (2006.01)
(52) U.S. Cl.
   USPC ......................................... 429/514
(58) Field of Classification Search
   USPC ......................................... 429/514
   See application file for complete search history.

(56) References Cited

U.S. PATENT DOCUMENTS

| 5,464,700 A | 11/1995 | Steck et al. |
| 5,514,487 A | 5/1996 | Washington et al. |

(Continued)

FOREIGN PATENT DOCUMENTS

| CN | 101479876 A | 7/2009 |
| JP | 2004-119185 | 4/2004 |

(Continued)

OTHER PUBLICATIONS

English Translation of JP 2007-273433.*

(Continued)

*Primary Examiner* — Ula C Ruddock
*Assistant Examiner* — Frank Chernow
(74) *Attorney, Agent, or Firm* — Finnegan, Henderson, Farabow, Garrett & Dunner LLP

(57) ABSTRACT

A fuel cell module may include a membrane electrode assembly, two gas diffusion layers, two current collectors, two sealing members, a fluid flow plate assembly. The fluid flow plate assembly may include a first manifold, a second manifold, and a fluid flow channel. The membrane electrode assembly may include at least one membrane for fuel cell reactions. The two gas diffusion layers may be respectively coupled with two opposite sides of the membrane electrode assembly. The two current collectors respectively coupled with the two gas diffusion layers, and the two sealing members respectively coupled with the two current collectors. The fluid flow plate assembly may be coupled with the membrane electrode assembly at a first side of the two opposite sides of the membrane electrode assembly, with at least a corresponding one of the two gas diffusion layers, at least a corresponding one of the two current collectors, and at least a corresponding one of the two sealing members coupled between the fluid flow plate assembly and the first side of the membrane electrode.

4 Claims, 10 Drawing Sheets

(56) References Cited

U.S. PATENT DOCUMENTS

| | | | |
|---|---|---|---|
| 5,629,104 | A | 5/1997 | Crawford et al. |
| 5,750,281 | A | 5/1998 | Washington et al. |
| 6,017,648 | A | 1/2000 | Jones |
| 6,127,058 | A | 10/2000 | Pratt et al. |
| 6,232,008 | B1 | 5/2001 | Wozniczka et al. |
| 6,274,262 | B1 | 8/2001 | Canfield |
| 6,410,179 | B1 | 6/2002 | Boyer et al. |
| 6,500,580 | B1 | 12/2002 | Marvin et al. |
| 6,607,858 | B2 | 8/2003 | Wozniczka et al. |
| 6,610,435 | B1 | 8/2003 | Maruyama et al. |
| 7,220,507 | B2 | 5/2007 | Liu et al. |
| 7,494,737 | B2 | 2/2009 | Arisaka et al. |
| 7,531,263 | B2 | 5/2009 | Liu et al. |
| 7,569,290 | B2 | 8/2009 | Liu et al. |
| 7,572,533 | B2 | 8/2009 | Liu et al. |
| 7,592,093 | B2 | 9/2009 | Liu et al. |
| 7,597,989 | B2 | 10/2009 | Hu et al. |
| 2009/0075153 | A1 | 3/2009 | Son et al. |
| 2009/0155663 | A1 | 6/2009 | Serizawa et al. |
| 2011/0132477 | A1* | 6/2011 | Chen et al. ............ 137/561 A |
| 2011/0136033 | A1* | 6/2011 | Chen et al. ............ 429/457 |
| 2011/0136042 | A1* | 6/2011 | Chen et al. ............ 429/514 |

FOREIGN PATENT DOCUMENTS

| | | |
|---|---|---|
| JP | 2004-119189 | 4/2004 |
| JP | 2004-273264 | 9/2004 |
| JP | 2007-273433 | 10/2004 |
| JP | 2006-107898 | 4/2006 |
| KR | 10-2007-0072872 | 7/2007 |
| KR | 10-2009-0007573 | 1/2009 |
| WO | WO 98/47197 | 10/1998 |
| WO | WO 2009/025613 A1 | 2/2009 |

OTHER PUBLICATIONS

Extended European Search Report for European Application No. 10180696.6, dated May 10, 2011.

Notification of Reasons for Refusal mailed by the Japanese Patent Office on Nov. 13, 2012 in Japanese Application No. 2010-215991.

* cited by examiner

MODULARIZED FUEL CELL DEVICES AND FLUID FLOW PLATE ASSEMBLIES

CROSS REFERENCE TO RELATED APPLICATIONS

This Application claims priority from U.S. provisional application No. 61/267,387, filed on Dec. 7, 2009, the entirety of which is incorporated by reference herein. The application also relates to three co-pending applications claiming priority also from U.S. provisional application No. 61/267,387. The first one, application Ser. No. 12/853,096, is entitled "Fluid Flow Plate Assemblies" filed on Aug. 9, 2010; the second one, application Ser. No. 12/860,421, is entitled "Fluid Flow Plate Assembly Having Parallel Flow Channels" filed on Aug. 20, 2010; and the third one, application Ser. No. 12/860,355, is entitled "Fuel Cell Devices" filed on Aug. 20, 2010. This Application further claims priority from Taiwan Patent Application No. 099107218, filed on Mar. 12, 2010, the entirety of which is incorporated by reference herein.

BACKGROUND

1. Technical Field

This application relates in general to fuel cell devices and fluid flow plate assemblies and in particular to fuel cell devices and fluid flow plate assemblies that are modularized.

2. Description of the Related Art

Fluid flow plates are structures that are designed for fluid-related applications, such as for carrying, delivering, dividing, and/or distributing one or more types of fluids. The term "fluid" is used here in a broad sense, which can be anything that is capable of flowing from one point to another. For example, a fluid may include air, gas, liquid, viscous fluid, etc., each of which is capable of flowing or moving itself or a part of it from one point to another.

As an illustrative example, one of the many uses for fluid flow plates is fuel cell applications, in which fluid flow plates may be used to transport, guide, and/or distribute one or more kinds of "fuel", which may be in a liquid or gaseous form, for generating electric power. FIG. 1 illustrates a sectional view of an exemplary fuel cell device in the prior art. Referring to FIG. 1, a single fuel cell 400, such as a Proton Exchange Membrane Fuel Cell (also known as "PEMFC"), may include a membrane electrode assembly 410, two gas diffusion layers 405 and 406, and two fluid flow plates 401 and 402. As illustrated, the two gas diffusion layers 405 and 406 may sandwich between them the membrane electrode assembly 410, and the two fluid flow plates 401 and 402 may sandwich between them both the membrane electrode assembly 410 and the two gas diffusion layers 405 and 406. The fluid flow plates 401 and 402 each may provide one or more flow channels, such as flow channels 403 and 404, and a reactant fluid may flow through each of the flow channels. As an example, the membrane electrode assembly 410 may include a proton exchange membrane 409, an anode catalyst layer 407, and a cathode catalyst layer 408. The anode and cathode catalyst layers 407 and 408 each may include platinum or platinum alloy, which may serve as a catalyst and facilitate electrochemical fuel cell reactions.

To facilitate the manufacturing, expansion, or design flexibility of fuel cell devices, fluid flow plate assemblies, or both, it may be desirable to provide modularized designs for fuel cell devices, fluid flow plate assemblies, or both.

SUMMARY

In one embodiment, a fuel cell module may include a membrane electrode assembly, two gas diffusion layers, two current collectors, two sealing members, a fluid flow plate assembly. The fluid flow plate assembly may include a first manifold, a second manifold, and a fluid flow channel. The membrane electrode assembly may include at least one membrane for fuel cell reactions. The two gas diffusion layers may be respectively coupled with two opposite sides of the membrane electrode assembly. The two current collectors respectively coupled with the two gas diffusion layers, and the two sealing members respectively coupled with the two current collectors.

The fluid flow plate assembly may be coupled with the membrane electrode assembly at a first side of the two opposite sides of the membrane electrode assembly, with at least a corresponding one of the two gas diffusion layers, at least a corresponding one of the two current collectors, and at least a corresponding one of the two sealing members coupled between the fluid flow plate assembly and the first side of the membrane electrode. The first manifold may have a fluid inlet for receiving an incoming fluid and may extend along a first direction to provide a channel for transporting the incoming fluid partially along the first direction. The first manifold may have at least one distribution outlet, wherein the first manifold releases at least one portion of the incoming fluid as a released fluid through the at least one distribution outlet. The second manifold may have a fluid outlet for discharging a discharged fluid, which may include at least one portion of the incoming fluid. The second manifold may extend along a second direction and have a channel for transporting the discharged fluid partially along the second direction. The second manifold receives the discharged fluid through at least one discharged fluid inlet on the second manifold. The fluid flow channel may couple between the first manifold and the second manifold and between at least one of the at least one distribution outlet and at least one of the at least one discharged fluid inlet for distributing at least one portion of the released fluid.

The fluid flow channel may have multiple channel sections extending in at least two directions and extending substantially along a fluid distribution plane. The at least one portion of the released fluid flowing through the at least one fluid flow channel and to the at least one of the at least one discharged fluid inlet as at least one portion of the discharged fluid. The fluid flow channel have an exposed side that is coupled with a membrane of the at least one membrane. Both the first direction and the second direction may be substantially parallel with the fluid distribution plane.

In another embodiment, a fuel cell module may include a membrane electrode assembly, two gas diffusion layers, two current collectors, two sealing members, a fluid flow plate assembly. The fluid flow plate assembly may include a first manifold, a second manifold, and a fluid flow channel. The membrane electrode assembly may include at least one membrane for fuel cell reactions. The two gas diffusion layers may be respectively coupled with two opposite sides of the membrane electrode assembly. The two current collectors respectively coupled with the two gas diffusion layers, and the two sealing members respectively coupled with the two current collectors.

The fluid flow plate assembly may be coupled with the membrane electrode assembly at a first side of the two opposite sides of the membrane electrode assembly, with at least a corresponding one of the two gas diffusion layers, at least a corresponding one of the two current collectors, and at least a corresponding one of the two sealing members coupled between the fluid flow plate assembly and the first side of the membrane electrode. The first manifold may have a fluid inlet for receiving an incoming fluid and may have a channel for transporting the incoming fluid partially along the first direction. The first manifold may have at least one distribution outlet, wherein the first manifold releases at least one portion of the incoming fluid as a released fluid through the at least one distribution outlet. The second manifold may have a fluid outlet for discharging a discharged fluid, which may include at least one portion of the incoming fluid. The second manifold may have a channel for transporting the discharged fluid partially along the second direction. The second manifold receives the discharged fluid through at least one discharged fluid inlet on the second manifold. The fluid flow channel may couple between the first manifold and the second manifold and between at least one of the at least one distribution outlet and at least one of the at least one discharged fluid inlet for distributing at least one portion of the released fluid.

The fluid flow channel may have multiple channel sections extending in at least two directions and extending substantially along a fluid distribution plane. The at least one portion of the released fluid flowing through the at least one fluid flow channel and to the at least one of the at least one discharged fluid inlet as at least one portion of the discharged fluid. The fluid flow channel have an exposed side that is coupled with a membrane of the at least one membrane. Both the first direction and the second direction may be substantially parallel with the fluid distribution plane.

BRIEF DESCRIPTION OF DRAWINGS

Embodiments disclosed herein can be more fully understood by reading the subsequent detailed description and examples with references made to the accompanying drawings, wherein.

DESCRIPTION OF EMBODIMENTS

Embodiments disclosed herein include fuel cell modules that have fluid flow plate assembly having one or more fluid flow channels. Multiple fuel cell modules may be stacked sequentially to form a fuel cell system or fuel cell battery. And electrodes of fuel cell modules may be coupled in series, in parallel, or in a combination of both to provide a desired voltage, current, or capacity. Multiple fluid flow channels may be arranged along one or more directions to provide one-, two-, or three-dimensional expansions of fluid flow channels. For example, two fluid flow channels may be placed on opposite sides of a dividing wall. In some embodiments, multiple fluid flow channels may share one or two common manifolds for the intake and/or discharge of a fluid.

Figure 1:
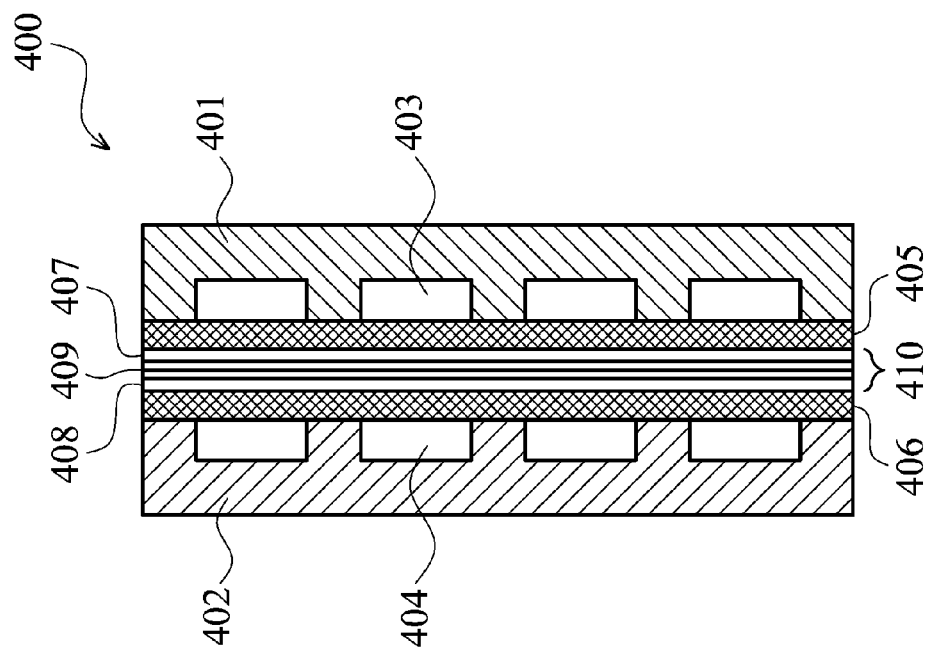
FIG. 1 illustrates a sectional view of an exemplary fuel cell device in the prior art.
Figure 2A:
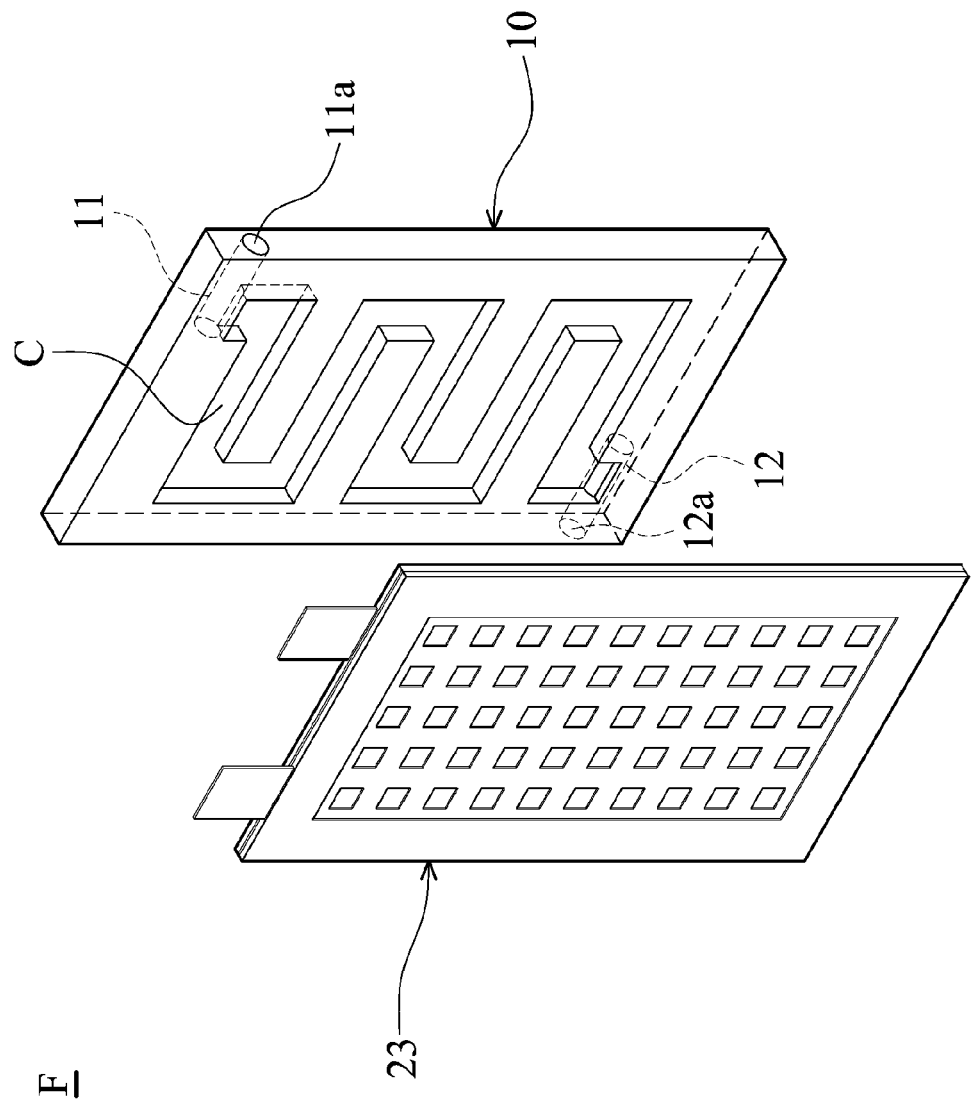
FIG. 2A illustrates an exploded view diagram of an exemplary fuel cell module consistent with an embodiment.

FIG. 2A illustrates an exploded view diagram of an exemplary fuel cell module device consistent with an embodiment. Referring to FIG. 2A, a fuel cell module F may include a main body 23 and a fluid flow plate assembly 10. The fluid flow plate assembly 10 may have a fluid flow channel C facing the main body 23. The fluid flow plate assembly 10 may be a rectangular or substantially rectangular structure in one embodiment. In one embodiment, the fluid flow plate assembly 10 may include a first manifold 11 and a second manifold 12 that communicate with the fluid flow channel C. A reactant/incoming fluid may enter the first manifold 11 through a fluid inlet 11a of the fluid flow plate assembly 10. Part of the incoming fluid may flow through fluid flow channel C, which provides an exposed reaction area for the fluid released into the fluid flow channel (released fluid), such as a reaction area exposed to a membrane of the main section 23, to facilitate electrochemical fuel cell reactions. In other words, the fluid flow channel C may have an exposed side that is coupled with a membrane of the main body 23, The fluid, partially or fully reacted, may be discharged through the second manifold 12, and the discharged fluid may leave the fluid flow plate assembly 10 through a fluid outlet 12a of the fluid flow plate assembly 10.

In some embodiments, the fluid flow plate assembly 10 may include more than fluid flow channels coupled between the first manifold 11 and the second manifold 12. The first manifold 11 may have a fluid inlet 11a for receiving the incoming fluid and extends along a first direction (such as a direction that is generally parallel to the top edge of the fluid flow plate assembly 10) to provide a channel for transporting the incoming fluid partially along the first direction. The second manifold 12 may have a fluid outlet 12a for discharging a discharged fluid, and the discharged fluid, as discussed above, may include a portion of the incoming fluid (or the entirety of the incoming fluid that has been reacted). The second manifold 12 may extend along a second direction (such as a direction that is generally parallel to the bottom edge of the fluid flow plate assembly 10) to provide a channel for transporting the discharged fluid partially along the second direction.

The first manifold 11 may release the incoming fluid through one or more fluid distribution outlets (the openings between the first manifold 11 and flow channels) on the first manifold 11. The second manifold 12 may receive the discharged fluid through one or more discharged fluid inlets (the openings between the second manifold 12 and flow channels) on the second manifold 12. The fluid flow channel C, as illustrated in FIG. 2A, may be coupled between one distribution outlet of the first manifold 11 and one discharged fluid inlet of the second manifold 12 for distributing at least one portion of the released fluid from the first manifold. In one embodiment, the fluid flow channel C may have multiple channel sections extending in at least two directions and extending substantially along the fluid distribution plane, which is parallel to the corresponding surface of the main body F. As a result, a portion of the released fluid may flow through the fluid flow channel C and through the distribution outlet to the second manifold 12 as the discharged fluid, As illustrated in FIG. 2A, both the first and second directions may be substantially parallel with the fluid distribution plane.

In some embodiments, the first manifold 11 may have a round (or nearly round) cross section with openings serving as the distribution outlets, which may arranged in a portion of a sidewall region of the first manifold 11. Each opening may occupy an angle range within the range of about 0 to about 180 degrees of a section of the first manifold 11 with respect to the center point of a cross section of the first manifold 11. Similarly, the second manifold 12 may have a round cross section with openings serving as the discharged fluid inlets, which may be arranged in a portion of a sidewall region of the second manifold 12. Each opening may be occupying an angle range within the range of about 0 to about 180 degrees of a section of the manifold with respect to the center of a cross section of the manifold.

Figure 2B:
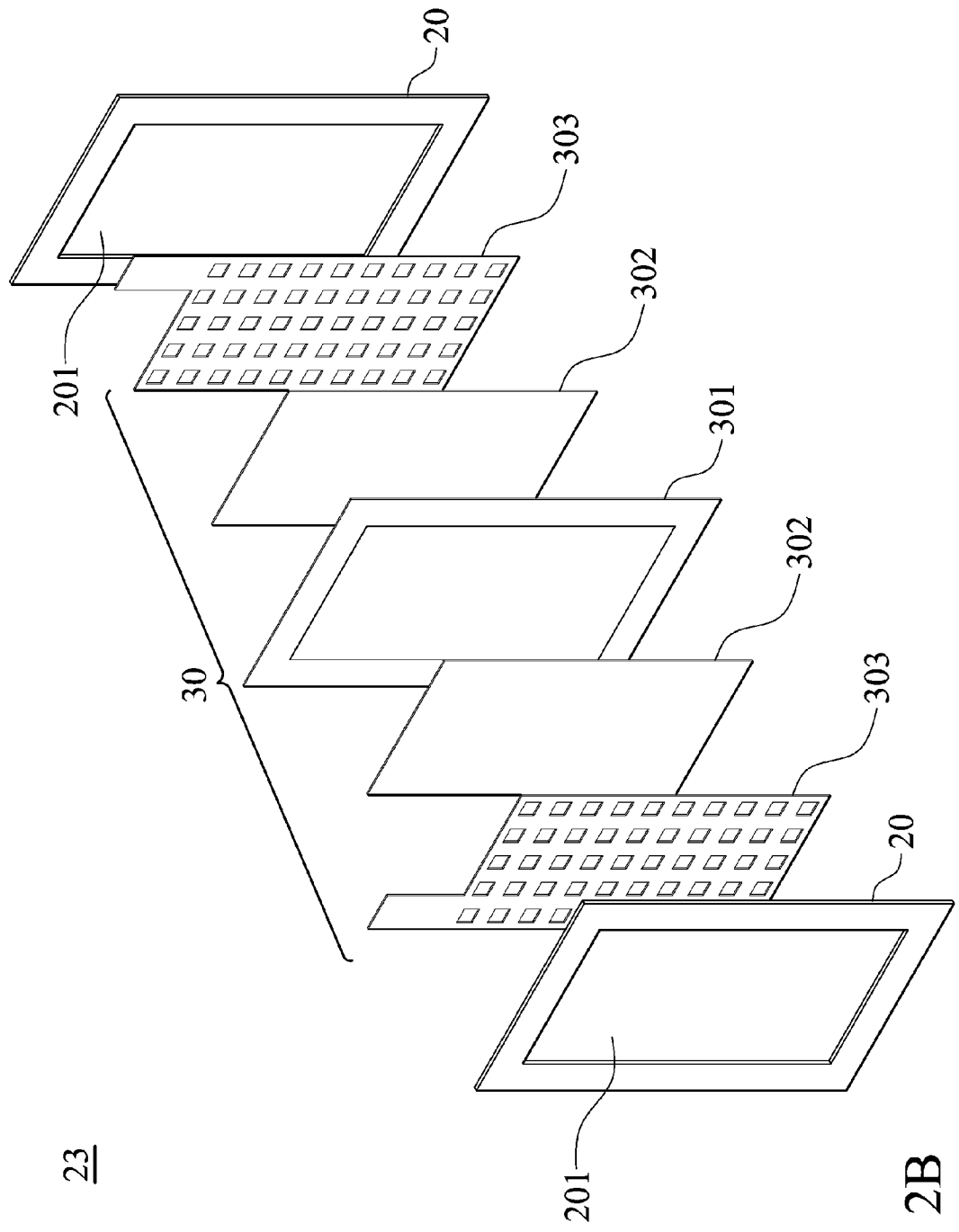
FIG. 2B illustrates an exploded view diagram of a portion of an exemplary fuel cell module consistent with an embodiment.

FIG. 2B illustrates an exploded view diagram of a portion of an exemplary fuel cell module device consistent with an embodiment. Referring to FIG. 2B, the main body 23 may include components for facilitating fuel cell reactions between two exposed fluid flow channels from two sides of the main body 23. In one embodiment, the main body 23 may include two sealing members 20 and a core 30, which may include a membrane electrode assembly 301, two gas diffusion layers 302, and two current collectors 303. In one embodiment, the membrane electrode assembly 301 may include one or more membranes, such as a proton exchange membrane, for fuel cell reactions. The two gas diffusion layers 302 may be respectively coupled with the two opposite sides of the membrane electrode assembly 301, and the two current collectors 303 may be respectively coupled with the two gas diffusion layers 302. The two sealing members 20 may be respectively coupled with the two current collectors 303. In one embodiment, the gas diffusion layers 302 and the current collectors 303 are symmetrically disposed on opposite sides (anode and cathode sides) of the membrane electrode assembly 301, and the current collectors 303 are exposed at the two exterior sides of the main body 23 through openings 201 of the sealing members 20.

Figure 2C:
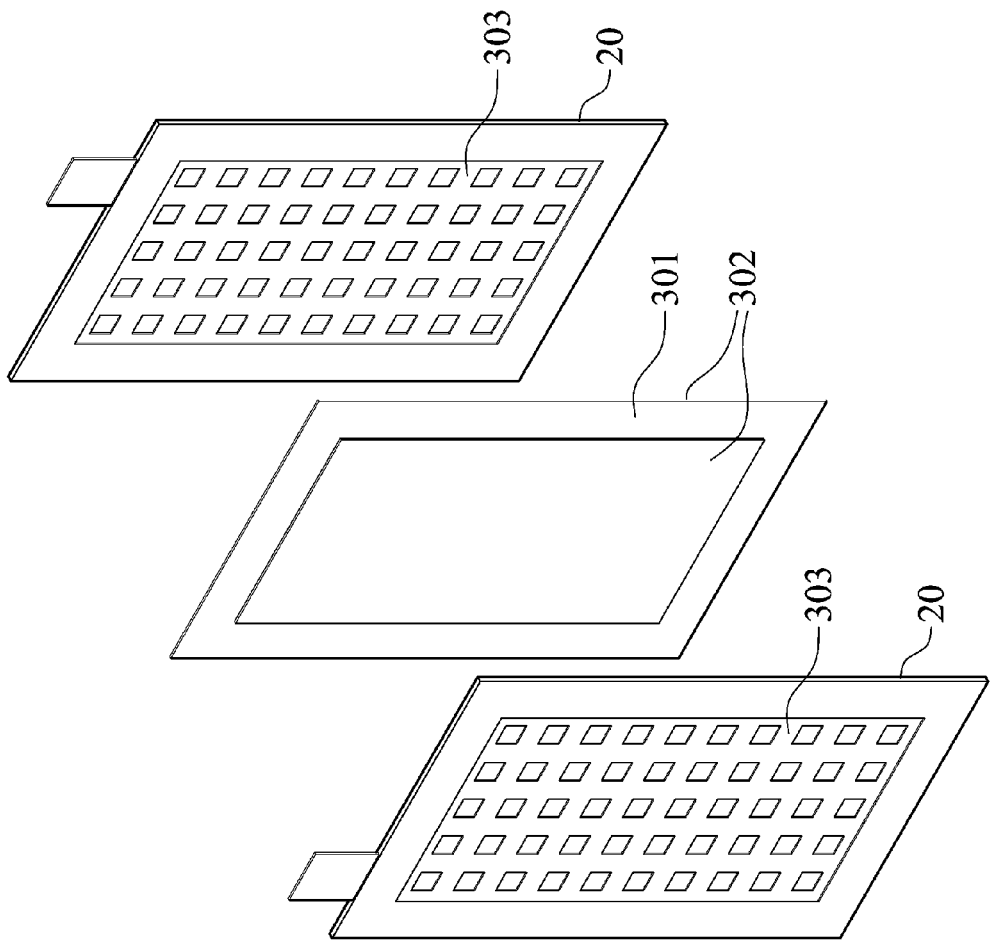
FIG. 2C illustrates an exploded view diagram of a portion of an exemplary fuel cell module with certain components of the module assembled consistent with an embodiment.

FIG. 2C illustrates an exploded view diagram of a portion of an exemplary fuel cell module device with certain components of the module assembled consistent with an embodiment. Referring to FIG. 2C, the sealing members 20 may be respectively attached to and may encompass or enclose the peripheral region of the current collectors 303 using various attachment techniques. Example of attachment techniques may include injection molding, hot pressing or adhesive. Similarly, the gas diffusion layers 302 may be attached to the membrane electrode assembly 301 using various attachment techniques, such as by hot pressing. To complete assembly of the main body 23, the sealing members 20 and the membrane electrode assembly 301 can be coupled together using various attachment techniques, such as by hot pressing or adhesive.

Figure 3:
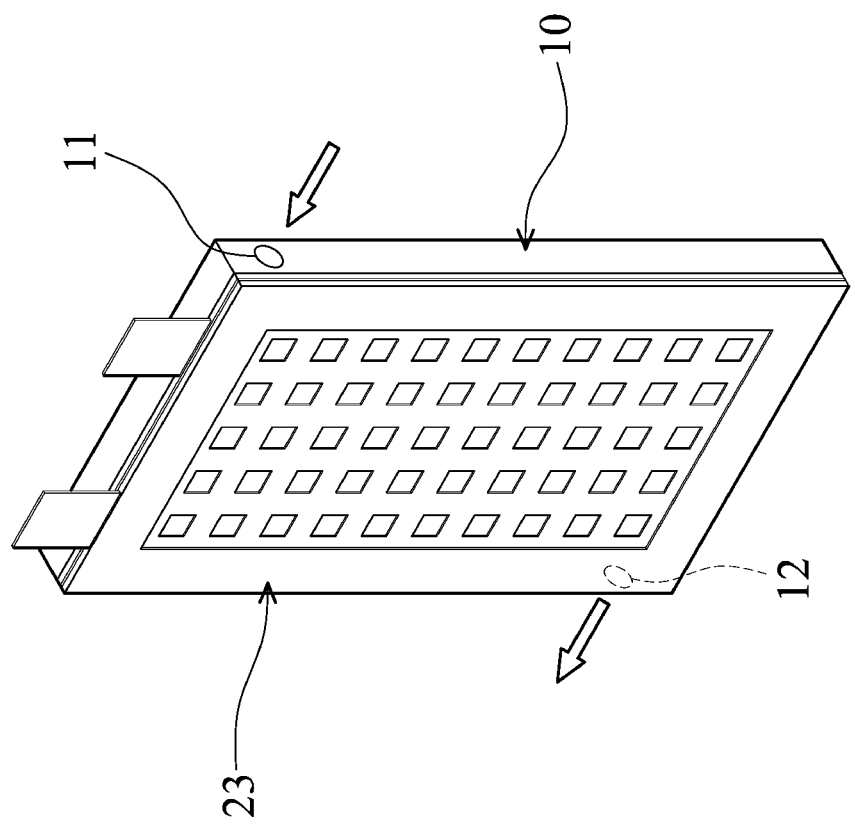
FIG. 3 illustrates a perspective diagram of an exemplary fuel cell module consistent with an embodiment.

FIG. 3 illustrates a perspective diagram of an exemplary fuel cell module consistent with an embodiment. Referring to FIG. 3, the main body 23 and the fluid flow plate assembly 10 are coupled together to form the fuel cell module F. Multiple fuel cell modules that are the same as or similar to the fuel cell module F may be stacked over each other to provide a fuel cell system or fuel cell battery. In one embodiment, the current collectors (or electrodes) of multiple fuel cell modules may be coupled in series, in parallel, or in a combination of both to provide a desired voltage, current, or capacity. As an example, a reactant/incoming fluid may enter into the fuel cell module F through the first manifold 11, such as from the right end of the fluid flow plate assembly 10 and flow through a fluid flow channel within the fluid flow plate assembly 10. The fluid flow channel may allow the incoming fluid to have contact with the main body 23 to facilitate electrochemical fuel cell reactions. The incoming fluid, after it is partially or fully reacted, may be discharged through the second manifold 12, such as from the left end of the fluid flow plate assembly 10.

Figure 4:
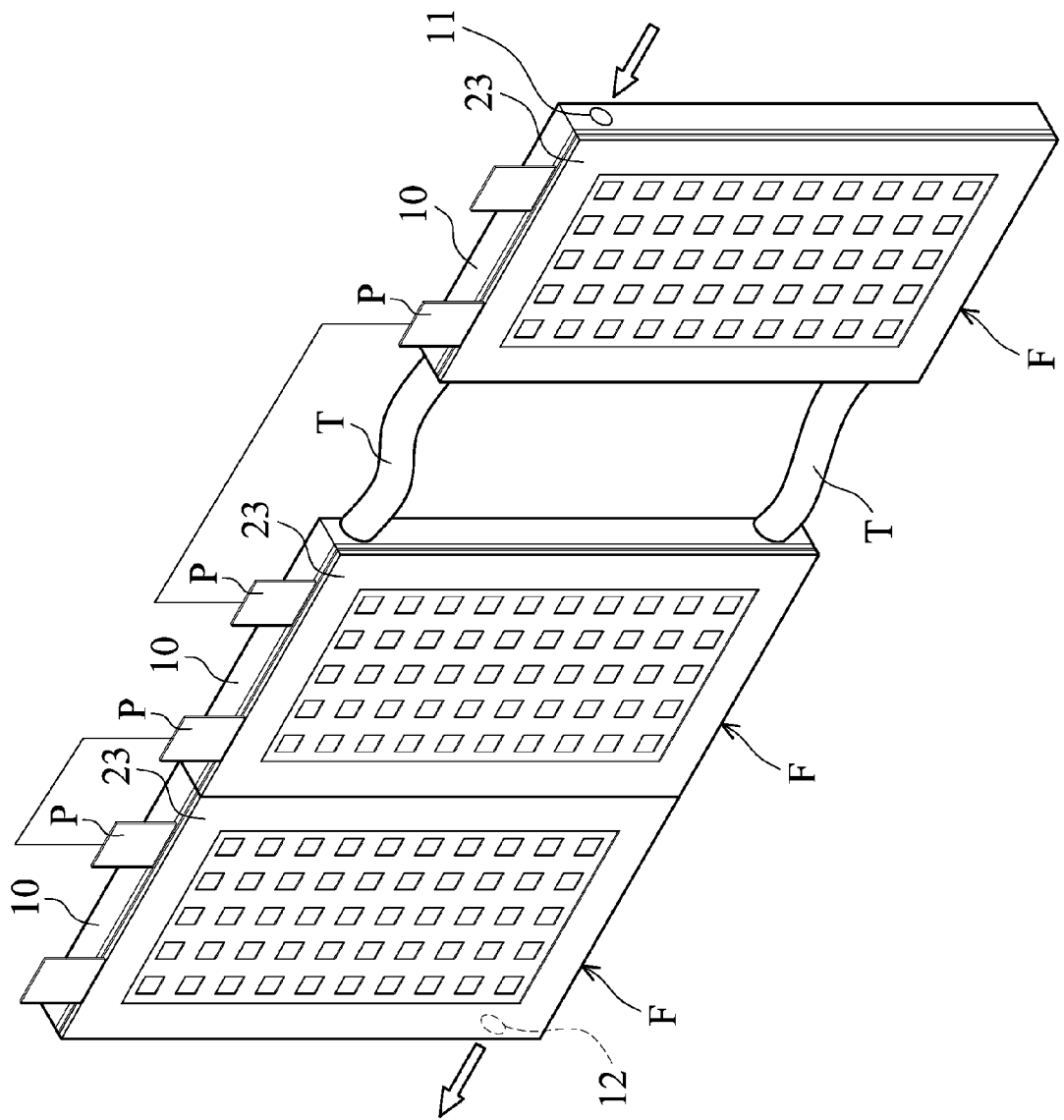
FIG. 4 illustrates a perspective diagram of two exemplary fuel cell modules consistent with an embodiment.

FIG. 4 illustrates a perspective diagram of several exemplary fuel cell modules consistent with an embodiment. Referring to FIG. 4, a plurality of fuel cell modules F can be coupled together to form a fuel cell system, which may have a planar configuration in one embodiment. Other than having two or more fuel modules stacked over each other as discussed above, the fuel cell modules F may also be replicated and coupled along the direction of the first manifold 11, i.e., arranged side by side, with multiple fluid flow channels C of adjacent fuel cell modules F sharing common fluid intake and discharge manifolds, such as the first manifold 11 and the second manifold 12. In some embodiments, certain adjacent fuel cell modules F may be coupled with each other via one or more flexible tubes or flexible tubular sections T, which enable the flow of the reactant/reacted fluid to or from different fuel cell modules F. In other words, one or both of the first manifold 11 and the second manifold 12 may include one or more tubular extensions coupled between two manifold sections. In one embodiment, conductive contacts P on the fuel cell modules F can be electrically coupled in parallel, in series, or in a combination of both to provide electrical output of the planar fuel cell device.

Specifically, in the embodiment illustrated in FIG. 4, the fluid flow plate assembly 10 may include the first manifold 11, the second manifold 12, and multiple (three illustrated) fluid flow channels coupled between the first manifold 11 and the second manifold 12. The first manifold 11 has its fluid inlet at the right end of the first manifold 11 for receiving the incoming fluid and extends along a first direction, such as the direction indicated by the arrow at the right in FIG. 4, to provide a channel for transporting the incoming fluid partially along the first direction. The second manifold 12 has its fluid outlet at the left end of the second manifold 12 for discharging a discharged fluid, and the discharged fluid may include a portion of the incoming fluid, which may have been partially or fully reacted. The second manifold 12 may extend along a second direction, such as the direction indicated by the arrow at the left in FIG. 4, to provide a channel for transporting the discharged fluid partially along the second direction. As illustrated in FIG. 4, both the first and second directions may be substantially parallel with the fluid distribution plane of the fluid flow channels. An example of the fluid flow channels is illustrated as fluid flow channel C in FIG. 2A that extends in at least two (vertical and horizontal) directions and extends along a fluid distribution plane.

Figure 5A:
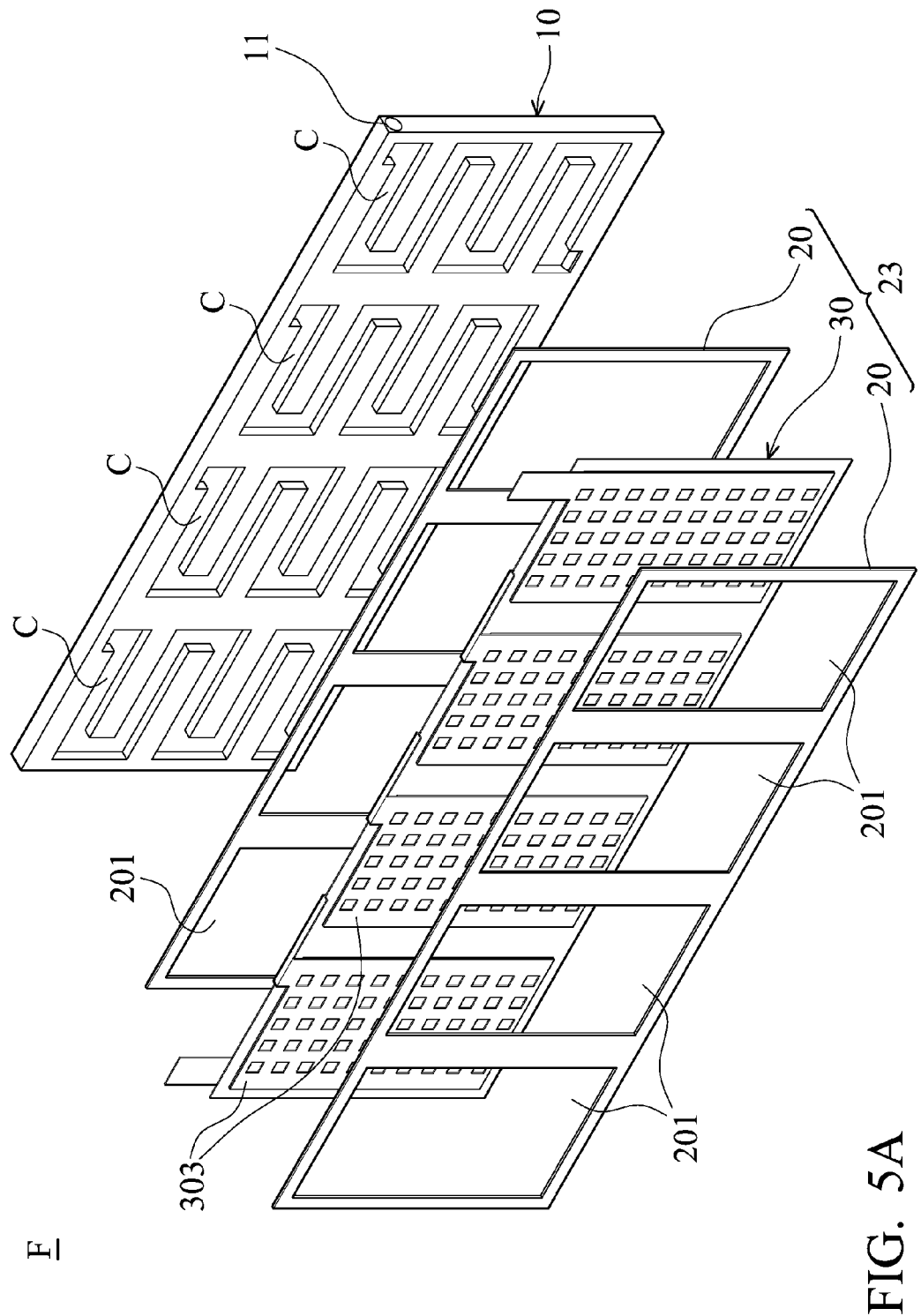
FIG. 5A illustrates an exploded view diagram of an exemplary fuel cell module having multiple fluid flow channels consistent with an embodiment.

FIG. 5A illustrates an exploded view diagram of an exemplary fuel cell module device having multiple fluid flow channels consistent with an embodiment. Referring to FIG. 5A, a fuel cell module F may include a main body 23 and a fluid flow plate assembly 10, each of which may have multiple sub-sections. For example, the fluid flow plate assembly 10 may have a plurality of fluid flow channels C that may share common intake and discharge manifolds, such as the first manifold 11 and the second manifold 12 illustrated in FIG. 4. The main body 23 may include the two sealing members 20 and the core 30 disposed between the two sealing members 20, with a plurality of current collectors 303 disposed on the opposite sides of the core 30. In one embodiment, each pair of current collectors 303 at the same location may correspond to the fluid flow channels C of the fluid flow plate 10 assembly. Each of the sealing members 20 may have several openings 201, each of which may correspond to and expose one of current collectors 303 or a significant portion of the current collector 303. The various attachment techniques discussed above may be used to couple the separate components of the fuel cell module F.

Figure 5B:
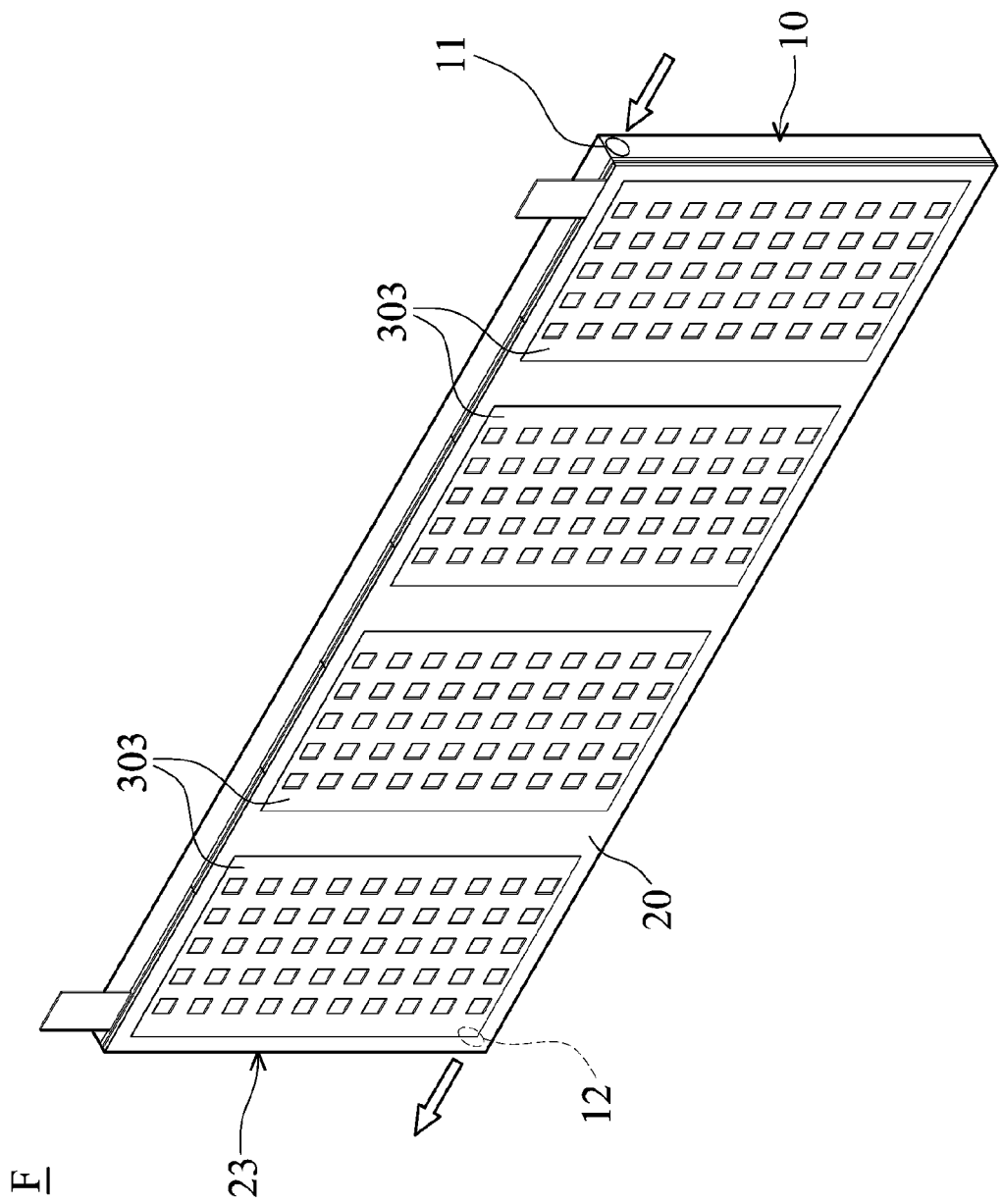
FIG. 5B illustrates a perspective diagram of an exemplary fuel cell module having multiple fluid flow channels consistent with an embodiment.

FIG. 5B illustrates a perspective diagram of an exemplary fuel cell module device having multiple fluid flow channels consistent with an embodiment. FIG. 5B illustrates an example of the fuel cell module F of FIG. 5A after its various components are assembled. As the arrows indicate in FIG. 5B, the reactant fluid can flow to the fluid flow channels C through the first manifold 11 from one end of the fluid flow plate assembly 10. The reactant fluid may be subsequently discharged through the second manifold 12 from another end of the fluid flow plate assembly 10.

In some embodiments, when multiple fuel cell modules are stacked over each other, fluid flow channels C may be placed on both sides of the fluid flow plate assembly 10, with a dividing wall between each pair of opposing fluid flow channels. Under such alternative design, each pair of the opposing fluid flow channels may have their outer surfaces exposed respectively to the two external sides the fluid flow plate assembly 10. Depending on its applications, design need, system size, or other considerations, a fluid flow plate assembly may have two or more fluid flow channels arranged (or expanded) one-, two-, or three-dimensionally.

Figure 6A:
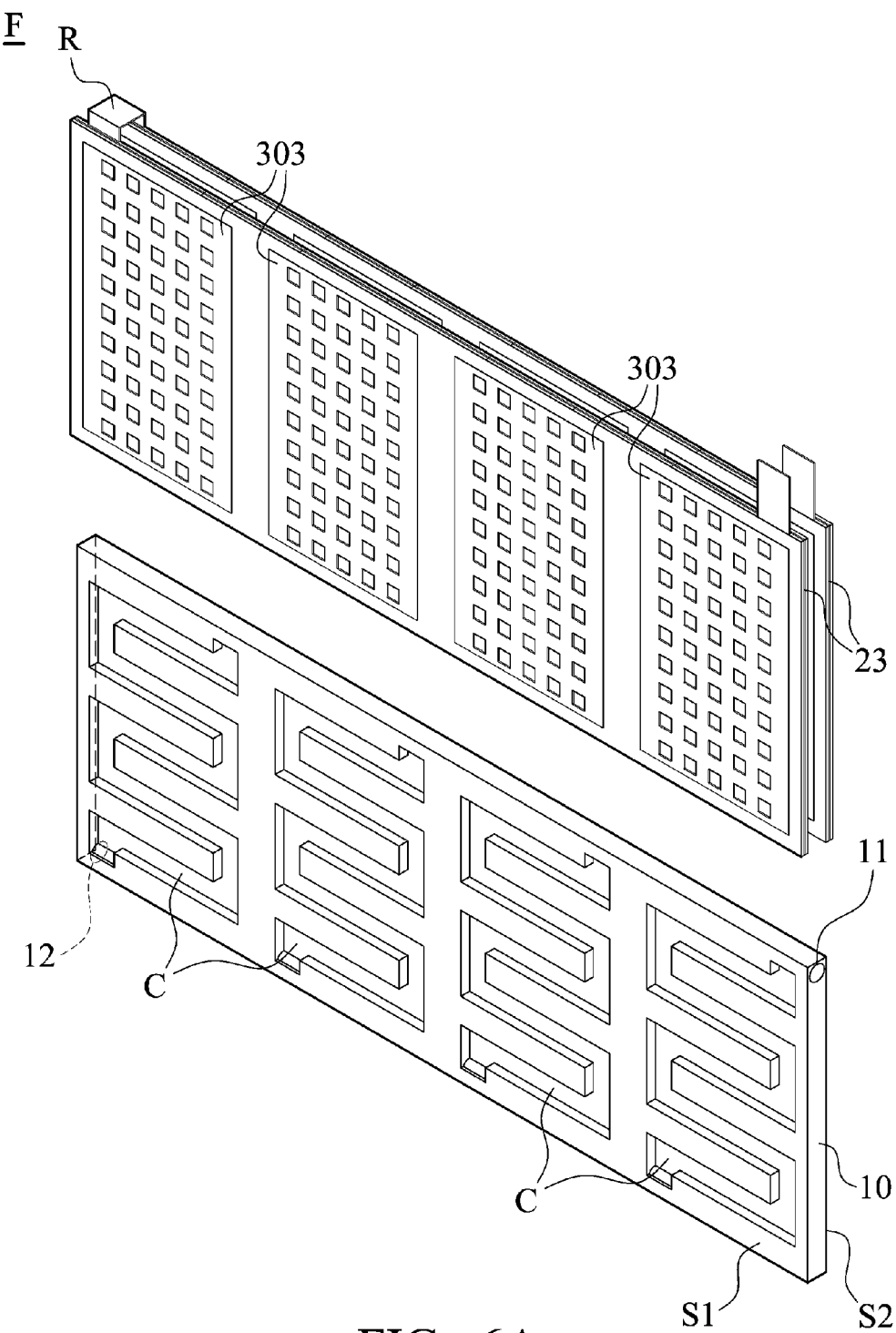
FIG. 6A illustrates an exploded view diagram of an exemplary fuel cell module device having multiple fluid flow channels consistent with an embodiment.
Figure 6B:
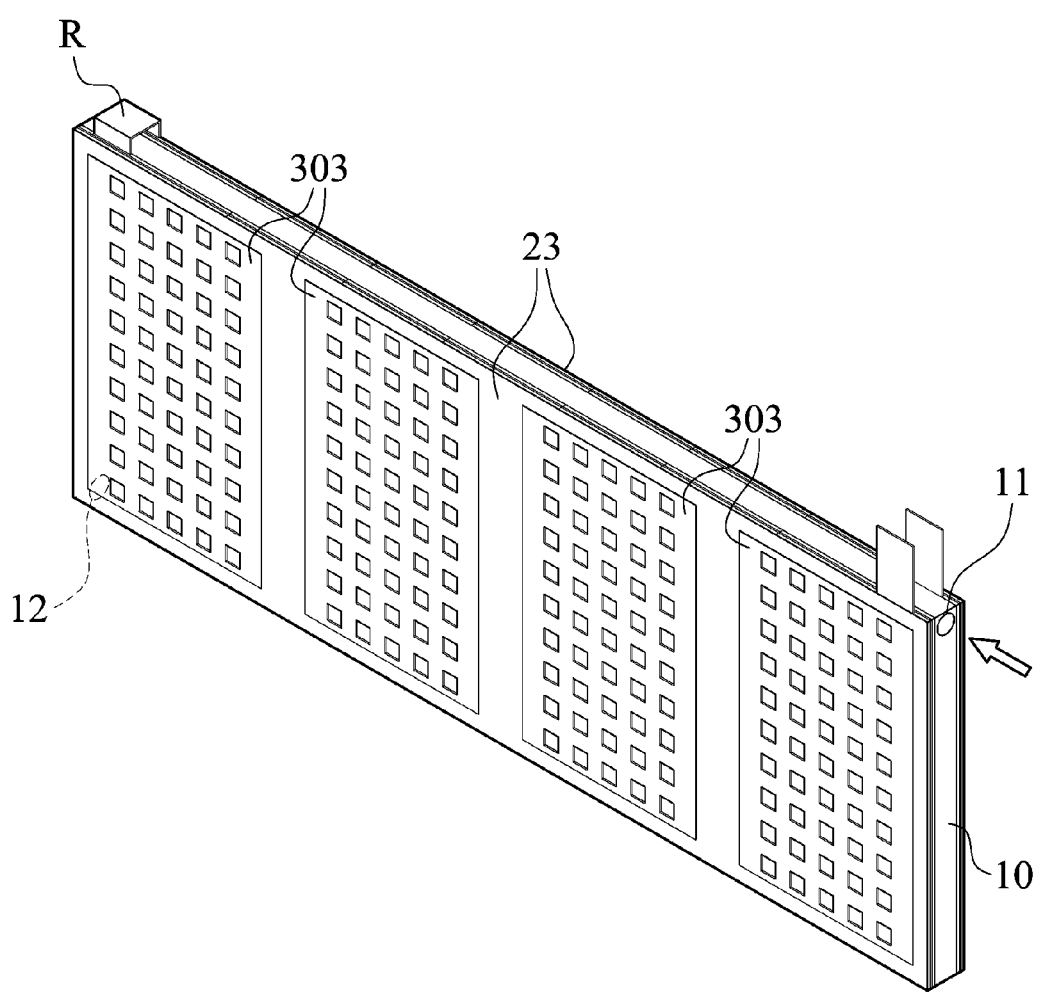
FIG. 6B illustrates a perspective diagram of an exemplary fuel cell module having multiple fluid flow channels consistent with an embodiment.

FIG. 6A illustrates an exploded view diagram of an exemplary fuel cell module device having multiple fluid flow channels consistent with an embodiment. FIG. 6B illustrates a perspective diagram of an exemplary fuel cell module device having multiple fluid flow channels consistent with an embodiment. Referring to FIGS. 6A and 6B, in another embodiment, a fluid flow plate assembly 10 may be coupled with two main bodies 23 to form a multi-layered fuel cell module F. For each location where a fluid flow channel is placed, at least two fluid flow channels C may be respectively formed on a first side S1 and a second side S2 of the fluid flow plate assembly 10, with a dividing wall between the two opposing fluid flow channels. In one embodiment, the fluid flow plate assembly 10 may be sandwiched between the two main bodies 23 so that the fluid flow channels C on the first and second sides S1 and S2 are respectively exposed to or face the corresponding current collectors 303 of the respective main bodies 23. In one embodiment, the two main bodies 23 on the opposite sides of the fluid flow plate 10 may be electrically coupled, physically coupled, or both electrically and physically coupled, by a member R, which may be a binding clamp that may also be electrically conductive. In the embodiments in which an electrical coupling is provided, the two main bodies 23 may be serially connected to increase the output voltage of a fuel cell device.

In embodiments where two fluid flow channels are coupled with the two opposite sides of the fluid flow plate assembly 10, another main body structure may be coupled with the second fluid flow channel. In one embodiment, a fuel cell module or device may have, in addition to the main body 23 and the fluid flow channel C described above, a parallel fluid flow channel separated from and substantially parallel to the fluid flow channel may be provided. The parallel fluid flow channel may be similarly coupled between the first manifold 11 and the second manifold 12 illustrated above, with the parallel fluid flow channel having multiple channel sections extending in two or more directions and extending substantially along the fluid distribution plane. The parallel fluid flow channel may have an exposed side. In addition, a parallel membrane electrode assembly may be included, which may have one or more membranes. One of the membranes may be coupled with the exposed side of the parallel fluid flow channel. Similarly, a parallel gas diffusion layer may be coupled with the parallel membrane electrode assembly, and a parallel current collector may be coupled with the parallel gas diffusion layer. A sealing member may also be coupled with the parallel current collector.

Embodiments herein provide a planar fuel cell module device and fuel cell module thereof. An embodiment of a fuel cell module comprises a main body and a fluid flow plate coupled with each other. In some embodiments, the fluid flow plate is coupled with two fuel cell modules to form a multi-layered fuel cell module. The sealing member may include a polymer or insulating material, and the current collector may include a metal, an electrically conductive composite material, or one or more other conductive materials. Additionally, the sealing member, the current collector, and the membrane electrode assembly can be connected by hot pressing or conductive adhesive. Since the fuel cell module has relatively small dimensions and is suitable for serial or parallel configuration, it can be widely applied in electronic apparatuses, vehicles, military equipments, the aerospace industry and so on.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fuel cell system, comprising:
 a first fuel cell module including a first fluid flow plate assembly, wherein the first fluid flow plate assembly includes:
  a first manifold having a fluid inlet for receiving an incoming fluid, the first manifold extending along a first direction and providing a channel for transporting the incoming fluid partially along the first direction, the first manifold having at least one distribution outlet, wherein the first manifold releases at least one portion of the incoming fluid as a released fluid through the at least one distribution outlet;
  a second manifold having a fluid outlet for discharging a discharged fluid, the discharged fluid comprising at least one portion of the incoming fluid, the second manifold extending along a second direction and providing a channel for transporting the discharged fluid partially along the second direction, the second manifold receiving the discharged fluid through at least one discharged fluid inlet on the second manifold; and
  at least one first fluid flow channel coupled between the first manifold and the second manifold and between at least one of the at least one distribution outlet and at least one of the at least one discharged fluid inlet for distributing at least one portion of the released fluid, the at least one first fluid flow channel having multiple channel sections extending in at least two directions and extending substantially along a first fluid distribution plane, the at least one portion of the released fluid flowing through the at least one first fluid flow channel and to the at least one of the at least one discharged fluid inlet as at least one portion of the discharged fluid;
 a second fuel cell module including a second fluid flow plate assembly, wherein the second fluid flow plate assembly includes:
  a third manifold having a fluid inlet for receiving an incoming fluid, the third manifold extending along the first direction and providing a channel for transporting the incoming fluid partially along the first direction, the third manifold having at least one distribution outlet, wherein the third manifold releases at least one portion of the incoming fluid as a released fluid through the at least one distribution outlet;

a fourth manifold having a fluid outlet for discharging a discharged fluid, the discharged fluid comprising at least one portion of the incoming fluid, the fourth manifold extending along the second direction and providing a channel for transporting the discharged fluid partially along the second direction, the fourth manifold receiving the discharged fluid through at least one discharged fluid inlet on the fourth manifold; and at least one second fluid flow channel coupled between the third manifold and the fourth manifold and between at least one of the at least one distribution outlet and at least one of the at least one discharged fluid inlet for distributing at least one portion of the released fluid, the at least one second fluid flow channel having multiple channel sections extending in at least two directions and extending substantially along a second fluid distribution plane, the at least one portion of the released fluid flowing through the at least one second fluid flow channel and to the at least one of the at least one discharged fluid inlet as at least one portion of the discharged fluid;

wherein the first direction is substantially parallel with the first fluid distribution plane and the second fluid distribution plane, and the second direction is substantially parallel with the first fluid distribution plane and the second fluid distribution plane; and a flexible external tubular section coupled between the first manifold of the first fluid flow plate assembly and the third manifold of the second fluid flow plate assembly, wherein the flexible external tubular section enables a flow of the incoming fluid between the first fuel cell module and the second fuel cell module.

2. The fuel cell system of claim 1, wherein the flexible external tubular section is a first flexible external tubular section, the fuel cell system further includes a second flexible external tubular section coupled between the second manifold of the first fluid flow plate assembly and the fourth manifold of the second fluid flow plate assembly, wherein the second flexible external tubular section enables a flow of the discharged fluid between the first fuel cell module and the second fuel cell module.

3. The fuel cell system of claim 1, wherein the first fuel cell module includes:

a membrane electrode assembly comprising at least one membrane for fuel cell reactions;

two gas diffusion layers respectively coupled with two opposite sides of the membrane electrode assembly;

two current collectors respectively coupled with the two gas diffusion layers;

two sealing members respectively coupled with the two current collectors; and wherein the first fluid flow plate assembly is coupled with the membrane electrode assembly at a first side of the two opposite sides of the membrane electrode assembly, with at least a corresponding one of the two gas diffusion layers, at least a corresponding one of the two current collectors, and at least a corresponding one of the two sealing members coupled between the first fluid flow plate assembly and the first side of the membrane electrode.

4. The fuel cell system of claim 1, wherein the second fuel cell module includes:

a membrane electrode assembly comprising at least one membrane for fuel cell reactions;

two gas diffusion layers respectively coupled with two opposite sides of the membrane electrode assembly;

two current collectors respectively coupled with the two gas diffusion layers;

two sealing members respectively coupled with the two current collectors; and wherein the second fluid flow plate assembly is coupled with the membrane electrode assembly at a first side of the two opposite sides of the membrane electrode assembly, with at least a corresponding one of the two gas diffusion layers, at least a corresponding one of the two current collectors, and at least a corresponding one of the two sealing members coupled between the second fluid flow plate assembly and the first side of the membrane electrode.

* * * * *